(12) United States Patent
Fujimoto et al.

(10) Patent No.: US 9,330,289 B2
(45) Date of Patent: May 3, 2016

(54) COMMUNICATION APPARATUS AND COMPUTER PROGRAM PRODUCT

(75) Inventors: Masaki Fujimoto, Hino (JP); Keiichi Tanioka, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 245 days.

(21) Appl. No.: 13/405,592

(22) Filed: Feb. 27, 2012

(65) Prior Publication Data

US 2012/0218085 A1    Aug. 30, 2012

(30) Foreign Application Priority Data

Feb. 28, 2011 (JP) ................................. 2011-041073

(51) Int. Cl.

| G06K 7/01 | (2006.01) |
|---|---|
| G06K 7/10 | (2006.01) |
| H04L 27/04 | (2006.01) |
| H04L 27/08 | (2006.01) |
| G06K 7/00 | (2006.01) |
| G06K 19/07 | (2006.01) |

(52) U.S. Cl.
CPC .......... *G06K 7/10217* (2013.01); *G06K 7/0008* (2013.01); *G06K 19/0723* (2013.01); *H04L 27/04* (2013.01); *H04L 27/08* (2013.01)

(58) Field of Classification Search
CPC ............ G06K 7/0008; G06K 7/10217; G06K 19/0723; H04L 27/04; H04L 27/08
See application file for complete search history.

(56) References Cited

U.S. PATENT DOCUMENTS

| 5,905,372 A * | 5/1999 | Kuffner et al. .......... 323/356 |
|---|---|---|
| 6,807,227 B2 * | 10/2004 | Chien .................... 375/224 |
| 6,946,950 B1 * | 9/2005 | Ueno et al. ............. 340/10.1 |
| 7,236,742 B2 * | 6/2007 | Hall et al. ............... 455/41.3 |
| 7,783,254 B2 * | 8/2010 | Raggam et al. ......... 455/41.1 |
| 8,060,012 B2 * | 11/2011 | Sklovsky ............ G06F 9/445 455/41.1 |
| 8,627,075 B2 * | 1/2014 | Ikeda ................... H04B 5/02 455/41.1 |
| 8,676,277 B2 * | 3/2014 | Takayama ............... 455/574 |
| 8,977,195 B2 * | 3/2015 | Levy ............... G06K 7/10237 455/41.1 |
| 2005/0280509 A1 * | 12/2005 | Tanaka et al. ........... 340/10.3 |

(Continued)

FOREIGN PATENT DOCUMENTS

| JP | 2006-054703 A | 2/2006 |
|---|---|---|
| JP | 2006-186882 A | 7/2006 |

(Continued)

OTHER PUBLICATIONS

Extended European Search Report (EESR) dated May 14, 2013 (in English) issued in counterpart European Application No. 12157028.7.

(Continued)

*Primary Examiner* — Benjamin C Lee
*Assistant Examiner* — Stephen Burgdorf
(74) *Attorney, Agent, or Firm* — Holtz, Holtz & Volek PC

(57) ABSTRACT

Disclosed is a communication apparatus comprising: a communication section which performs communication in an ASK modulation format with an RFID tag; and a control section which sets a modulation degree of the ASK modulation of the communication section to a large degree when polling of the RFID tag is performed by the communication section and which sets the modulation degree to a small degree when response information is received from the RFID tag through the communication section.

12 Claims, 9 Drawing Sheets

(56) References Cited

U.S. PATENT DOCUMENTS

| | | |
|---|---|---|
| 2006/0197658 A1* | 9/2006 | Light et al. ............... 340/539.23 |
| 2008/0030336 A1 | 2/2008 | Endo et al. |
| 2008/0136600 A1* | 6/2008 | Yeo et al. .................... 340/10.4 |
| 2009/0322484 A1 | 12/2009 | Toriyama et al. |
| 2010/0026454 A1* | 2/2010 | Rowse et al. ................ 340/10.1 |
| 2010/0328045 A1* | 12/2010 | Goto et al. .................. 340/10.4 |
| 2011/0084816 A1* | 4/2011 | Briese et al. ............... 340/10.34 |

FOREIGN PATENT DOCUMENTS

| | | |
|---|---|---|
| JP | 2008-016952 A | 1/2008 |
| JP | 2010-009353 A | 1/2010 |
| JP | 2010-074786 A | 4/2010 |

OTHER PUBLICATIONS

Japanese Office Action dated Feb. 5, 2013 (and English translation thereof) in counterpart Japanese Application No. 2011-041073.

* cited by examiner

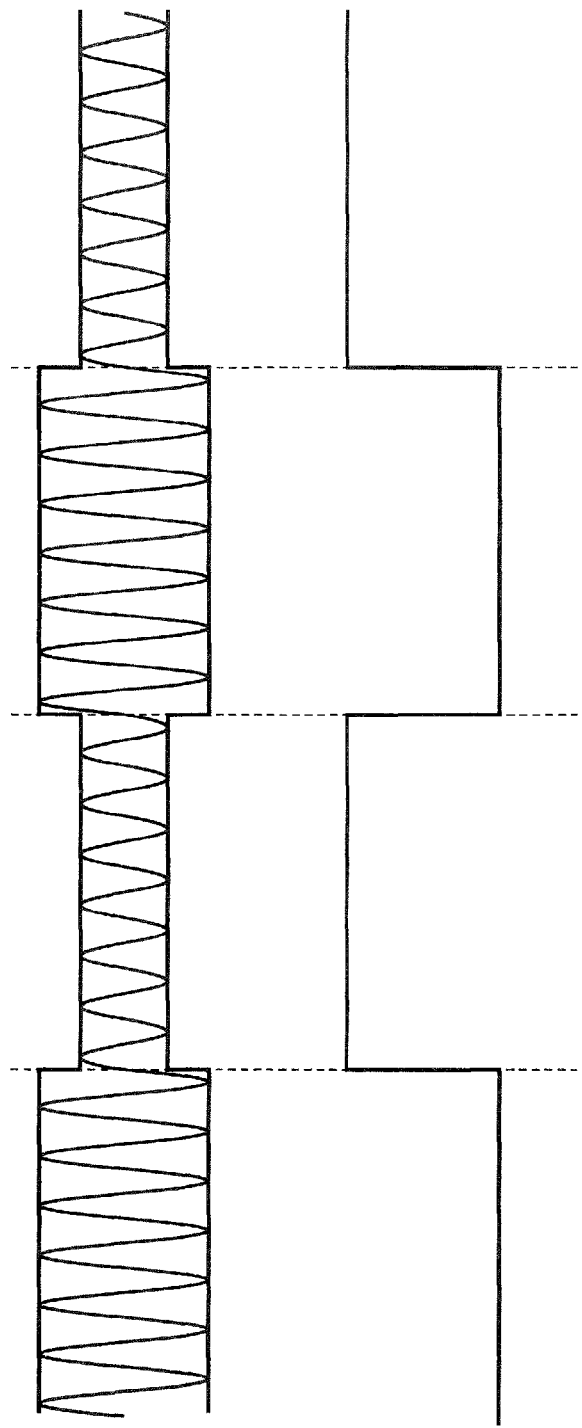

FIG. 5

| Rmod | SETTING VALUE [Ω] | MODULATION DEGREE [%] |
|---|---|---|
| R1 | 50 | 30 |
| R2 | 10 | 10 |

COMMUNICATION APPARATUS AND COMPUTER PROGRAM PRODUCT

BACKGROUND OF THE INVENTION

1. Field of the Invention

The present invention relates to a communication apparatus and a computer program product.

2. Background Art

Conventionally, as a technique of automatic identification, RFID (Radio Frequency Identification) is known. Specifically, RFID is a technique in which an RFID reader/writer communicates by near field communication using an electromagnetic field or radio wave to read information or write information stored in an RFID tag.

As an RFID tag, a passive type (passive tag) is usually used. The passive tag does not include a cell, and when an electromagnetic wave or radio wave is received from the RFID reader/writer, an electric current occurs and is rectified to be used as electric power to drive the RFID tag itself. Most RFID tags are formed from a configuration in which the electric power of reception is used as the driving power for responding to the RFID reader/writer.

According to such configuration, the RFID tag cannot generate driving electric power to operate the RFID tag unless the RFID tag is near the antenna of the RFID reader/writer to a certain extent, and the communication distance is usually at a close range. Although the situation differs depending on frequency band and shape of antenna, the maximum communication distance of a battery driven portable terminal such as a PDA (Personal Digital Assistant), a handy terminal, etc. is about 20 mm.

Moreover, there is known a wireless communication apparatus in which transmission output level is reduced to prevent interruption of communication by a strong magnetic field from an antenna when a noncontact IC card (RFID tag) as a communication target comes near (For example, see Japanese Unexamined Patent Application Publication No. 2006-54703).

RFID is used for the purpose of not only reading information from an RFID tag attached to equipment for counting inventory in a warehouse or an RFID tag attached to merchandise for managing inventory in a store, etc., but also for the purpose of using the RFID tag as an authentication key of a portable terminal including an RF reader/writer function.

In a configuration in which polling is performed for the purpose of such authentication, the RFID reader/writer section of the portable terminal constantly continues to perform monitoring operation of whether or not there is an RFID tag within the communication range (detection operation of RFID tag) while waiting to login.

Polling is processing which periodically performs inquiry of a search for an RFID tag (whether there is a request for transmission). When there is a response that there is a transmission request from an RFID tag, the communication starts.

Therefore, polling is performed by periodically and continuously emitting an electromagnetic field from the RF reader/writer section during the detection operation of the RFID tag. Consequently, the operation time of the portable terminal becomes short due to the electric power consumption by output of the electromagnetic field.

With the above conventional wireless communication apparatus which reduces transmission output level, the consumed electric power can be reduced when the transmission output level is reduced. However, the communication range (communication distance) also becomes small.

Moreover, in a configuration in which polling is performed, it is possible to consider a configuration in which the interval of polling is large in order to reduce consumption of electric power. However, the detection operation of the RFID tag becomes slow which worsens usability of the portable terminal.

SUMMARY OF THE INVENTION

The present invention has been made in consideration of the above situation, and one of the main objects is to reduce consumption of electric power without reducing reading speed and communication range of an RFID tag.

In order to achieve any one of the above advantages, according to an aspect of the present invention, there is provided a communication apparatus including:

a communication section which performs communication in an ASK modulation format with an RFID tag; and a control section which sets a modulation degree of the ASK modulation of the communication section to a large degree when polling of the RFID tag is performed by the communication section and which sets the modulation degree to a small degree when response information is received from the RFID tag through the communication section.

According to another aspect, there is provided a computer program product which is readable by a computer used in a communication apparatus and in which an instruction to perform computer processing is encoded, the computer processing including:

communicating in an ASK modulation format with an RFID tag; and controlling which sets a modulation degree of the ASK modulation to a large degree when polling of the RFID tag is performed in the communicating step and which sets the modulation degree to a small degree when response information is received from the RFID tag in the communicating step.

Consequently, according to the present invention, it is possible to reduce consumption of electric power without reducing the reading speed and the communication range of the RFID tag.

BRIEF DESCRIPTION OF THE DRAWINGS

The present invention and the above-described objects, features and advantages thereof will become more fully understood from the following detailed description with the accompanying drawings and wherein;

FIG. 3A is a diagram showing a waveform of an electric signal after modulation by ASK modulation;

FIG. 3B is a diagram showing a waveform of an electric signal before modulation by ASK modulation;

FIG. 5 is a diagram showing a configuration of the first modulation degree table;

DETAILED DESCRIPTION OF THE PREFERRED EMBODIMENTS

A preferred embodiment and first to fourth modifications for carrying out the present invention are described in detail in the above order with reference to the attached drawings. However, the scope of the invention is not limited to the embodiments and the illustrated examples.

(Preferred Embodiment)

A preferred embodiment of the present invention is described with reference to FIG. 1 to FIG. 6. First, the configuration of the apparatus of the present embodiment is described with reference to FIG. 1 and FIG. 2.

Figure 1:
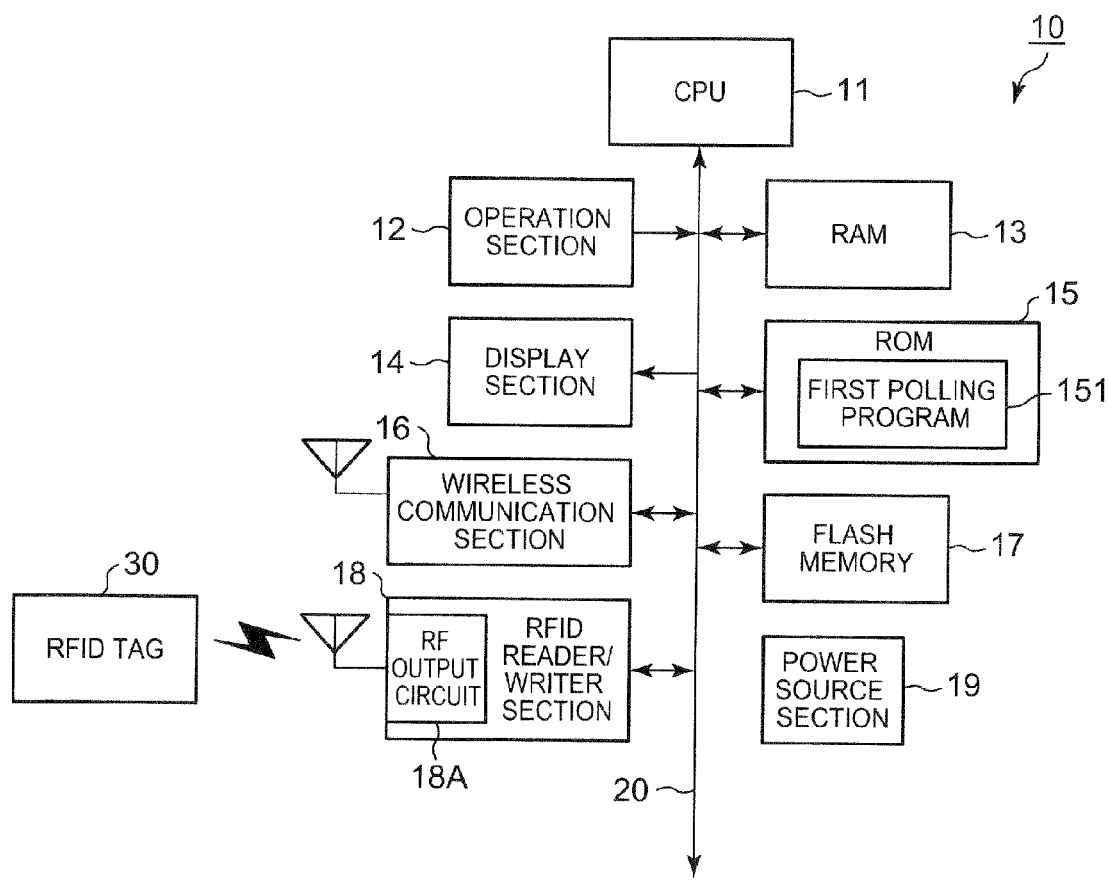
FIG. 1 is a block diagram indicating a configuration of a portable terminal of an embodiment of the present invention.

FIG. 1 is a block diagram showing a configuration of a portable terminal 10 of the present embodiment.

Figure 2:
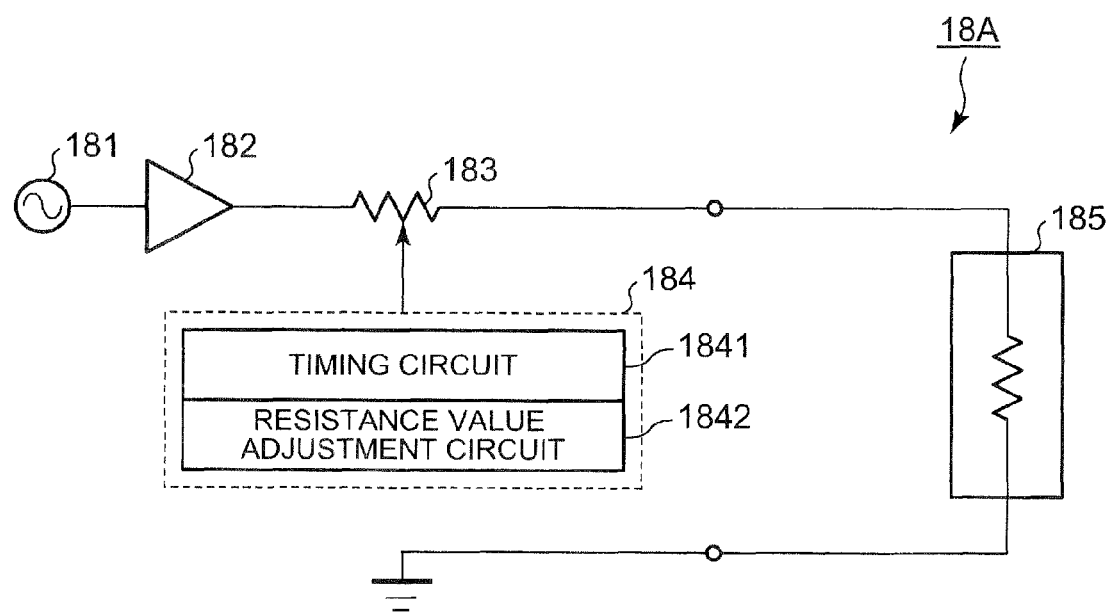
FIG. 2 is a circuit diagram of an RF output circuit.

FIG. 2 is a circuit diagram showing a configuration of an RF output circuit 18A.

As shown in FIG. 1, the portable terminal 10 as a communication apparatus of the present embodiment is a handy terminal which reads and manages information of an RFID tag 30 as a reading target. The RFID tag 30 is determined by the user who uses the RFID tag. For example, an RFID tag 30 is provided on each employee ID badge of employees of a company. The RFID tag 30 stores a user ID for identifying the user (employee) who owns the RFID tag 30. The portable terminal 10 performs user authentication using the RFID tag 30.

The RFID tag 30 is an electromagnetic induction type RFID tag. The RFID tag 30 includes a communication section including a coil antenna, a control section, and an EEPROM (Electrically Erasable Programmable Read Only Memory). In the RFID tag 30, the control section performs wireless communication with the portable terminal 10 through an electromagnetic field using the communication section and reads out data stored in the EEPROM according to the reading request received from the portable terminal 10 to transmit the data to the portable terminal 10. The control section of the RFID tag 30 writes or rewrites the data received from the portable terminal 10 in the EEPROM.

The EEPROM of the RFID tag 30 stores individual identification information of the RFID tag 30 and the above user ID. The RFID tag 30 is a passive type RFID tag which obtains electric power by the electromagnetic field from the portable terminal 10. However, the RFID tag 30 can be an active type RFID tag which includes a power source section and outputs an electromagnetic field by electric power from the power source.

The portable terminal 10 includes a CPU (Central Processing Unit) 11 as a control section, an operation section 12, a RAM (Random Access Memory) 13, a display section 14, a ROM (Read Only Memory) 15, a wireless communication section 16, a flash memory 17, an RFID reader/writer section 18 as a communication section and power source section 19. Each section of the portable terminal 10 except for the power source section 19 is connected to each other through a bus 20.

The CPU 11 controls each section of the portable terminal 10. The CPU 11 reads out a specified program among the various programs from the ROM 15, expands the program in the RAM 13 and performs various processing in coordination with the expanded program.

According to the first polling program 151, the CPU 11 sets the modulation degree of ASK (Amplitude Shift Keying) modulation of the RFID reader/writer section 18 to a large degree when polling of the RFID tag 30 is performed by the RFID reader/writer section 18, and when response information is received from the RFID tag 30 through the RFID reader/writer section 18, the control section 11 sets the modulation degree of ASK modulation of the RFID reader/writer section 18 to a small degree.

The operation section 12 includes a key group including various keys such as a character input key, etc. and outputs to the CPU 11 operation information according to the pressed input of the keys by the user. The operation section 12 includes a trigger key for reading information by the RFID reader/writer section 18.

The RAM 13 is a volatile semiconductor memory and includes a work area to store various pieces of data and various programs.

The display section 14 is a display section including a display panel such as an LCD (Liquid Crystal Display), an EL (Electro Luminescence) display, etc. and performs various display on the display panel according to the display information input from the CPU 11.

The ROM 15 is a read only semiconductor memory which stores various pieces of data and various programs. The first polling program 151 is stored in the ROM 15.

The wireless communication section 16 is a wireless communication section of a mobile telephone communication type. The wireless communication section 16 includes an antenna, modulation section, demodulation section, signal processing section, etc. and performs wireless communication with a base station. The wireless communication section 16 processes the signal of the information to be transmitted with the signal processing section, modulates the signal with the modulation section, and transmits the signal as a wireless radio wave from the antenna to the base station.

The base station is connected with equipment of a communication target through a communication network. The wireless communication section 16 demodulates with the demodulation section the received signal of the wireless radio wave received from the base station with the antenna, processes the signal with the signal processing section and obtains the received information. With this, the wireless communication section 16 performs communication with the equipment of the communication target through the base station. The wireless communication section 16 can be a wireless communication section of a wireless LAN (Local Area Network) type and the wireless communication section 16 can communicate with the equipment of the communication target through an access point.

The flash memory 17 is a nonvolatile semiconductor memory which stores information in a readable and writable state. The flash memory 17 stores a later described modulation degree table 40.

The RFID reader/writer section 18 is an electromagnetic induction type RFID reader/writer section which reads and writes information stored in the RFID tag 30. The RFID reader/writer section 18 performs communication with the RFID tag 30 in the ASK modulation format through an electromagnetic field.

The RFID reader/writer section 18 includes an RFID output circuit 18A, a demodulation section, a signal processing section, and the like to output an electromagnetic field for performing communication with the RFID tag 30.

The RFID reader/writer section 18 processes the electric signal of the transmission data input from the CPU 11 with the signal processing section and the RF output circuit 18A performs ASK modulation on the electric signal to output the electric signal as an electromagnetic field.

The RFID tag 30 receives data through the electromagnetic field output from the RFID reader/writer section 18 and outputs data to be transmitted to the RFID reader/writer section 18 through the electromagnetic field.

The RFID reader/writer section 18 receives data with the RF output circuit 18A through the electromagnetic field output from the RFID tag 30, demodulates the electric signal of the data with the demodulation section, processes the signal with the signal processing section, and receives the data.

The power source section 19 is a secondary cell such as a lithium cell, etc. and supplies power to each section of the portable terminal 10.

The power source section 19 may be a primary cell such as an alkaline cell, etc.

The RF output circuit 18A of the RFID reader/writer section 18 is described with reference to FIG. 2.

FIG. 2 is a circuit diagram showing a circuit configuration of the RF output circuit 18A.

The RF output circuit 18A includes a switching circuit 181, an output amplifier 182, an amplitude adjustment resistance 183, a modulation section 184, and an antenna and matching circuit 185. The modulation section 184 includes a timing circuit 1841 and resistance value adjustment circuit 1842.

The switching circuit 181 is an oscillation section which generates an electric signal in a waveform of a basic frequency. The basic frequency is, for example, 13.56 [MHz] determined by the standard of the RFID. The output amplifier 182 amplifies the electric signal output from the switching circuit 181. The amplitude adjustment resistance 183 is a variable resistance and is the resistance of the electric signal output from the output amplifier 182.

According to the transmission data input from the CPU 11, the modulation section 184 adjusts the resistance value of the amplitude adjustment resistance 183 to perform ASK modulation of the electric signal output from the output amplifier 182. According to the transmission data input from the CPU 11, the timing circuit 1841 changes the resistance value when modulation is performed and when modulation is not performed to control timing of changing the resistance value of the amplitude adjustment resistance 183. According to the transmission data input from the CPU 11, the resistance value adjustment circuit 1842 changes the resistance value when modulation is performed and when modulation is not performed and controls the multiplier of the resistance value of the amplitude adjustment resistance 183.

The antenna and matching circuit 185 includes a coil antenna and matching circuit. In FIG. 2, the antenna and matching circuit 185 is simplified to show the resistance. The antenna and matching circuit 185 match impedances with the coil antenna using the matching circuit and outputs the electric signal output from the amplitude adjustment resistance 183 as the electromagnetic field from the coil antenna. The output impedance of the antenna and matching circuit 185 is set to 50 [Ω].

From the output stage of the output amplifier 182, the resistance value of the entire RF output circuit 18A becomes large compared to when the modulation is not performed in order to lower the amplitude when modulation is performed. Therefore, the electric current which flows in the RF output circuit 18A becomes small when modulation is performed compared to when modulation is not performed. In other words, the larger the modulation degree when modulation is performed is, the more electric current can be reduced.

As described later, the modulation degree is standardized with ISO (International Organization for Standardization), etc. and the percentage of amplitude is quantified. However, the circuit of the RFID tag 30 itself can communicate to a certain extent according to the ability and performance even outside the modulation degree standardized with the ISO.

If the electric power for operating the RFID tag 30 can be sufficiently supplied when modulation is not performed, the modulation degree can be increased and the output can be reduced.

Next, modulation in the RF output circuit 18A of the RFID reader/writer section 18 is described with reference to FIG. 3A, FIG. 3B and FIG. 4A, FIG. 4B.

FIG. 3A is a diagram showing a waveform of an electric signal after modulation by ASK modulation.

FIG. 3B is a diagram showing a waveform of an electric signal before modulation by ASK modulation.

Figure 4A:
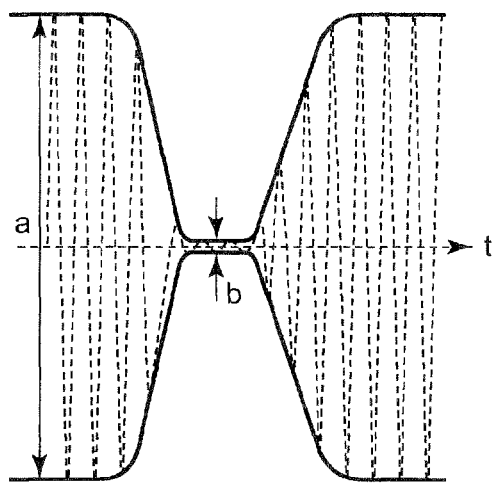
FIG. 4A is a diagram showing a waveform of an electric signal when modulation degree of ASK modulation is 100%.

FIG. 4A is a diagram showing a waveform of an electric signal when modulation degree by ASK modulation is 100%.

Figure 4B:
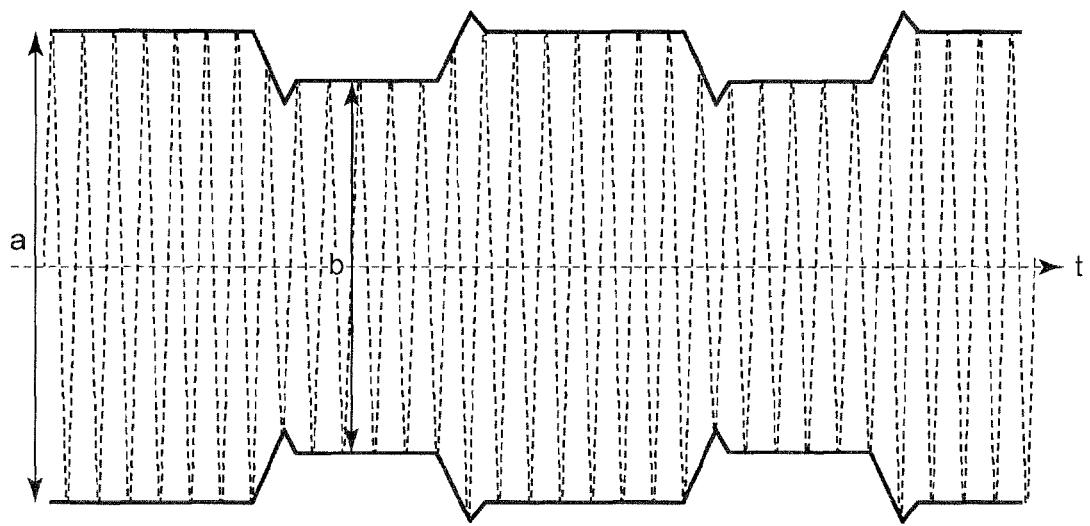
FIG. 4B is a diagram showing a waveform of an electric signal when modulation degree of ASK modulation is 10%.

FIG. 4B is a diagram showing a waveform of an electric signal when modulation degree by ASK modulation is 10%.

The RF output circuit 18A of the RFID reader/writer section 18 performs ASK modulation. In RFID communication, ASK modulation where circuit configuration can be simplified is widely used. ASK modulation is a format where a digital signal of 0 and 1 as shown in FIG. 3B is substituted by a waveform of two types of amplitudes to be modulated as shown in FIG. 3A.

The modulation degree of ASK modulation is determined by the following formula (1).

Note a: value of larger amplitude, b: value of smaller amplitude.

$$\text{modulation degree [\%]} = 100*(a-b)/(a+b) \tag{1}$$

The modulation degree is different according to the communication standard of the RFID tag, however the modulation degree is specified with a numeric value by a standardizing body such as ISO so that the modulation degree is compatible. In the following table 1, the modulation degree of the RFID standard of 13.56 [MHz] is shown. However, the actual RFID tag is usually designed with a margin to be able to communicate outside the standardized reference to some extent.

TABLE 1

| STANDARD | MODULATION DEGREE [%] |
| --- | --- |
| ISO14443 Type A | 100 |
| ISO14443 Type B | 8 to 14 |
| Felica | 8 to 14 |
| ISO15693 | 8 to 14 |

As shown in FIG. 4A, in an RFID standard of the 13.56 [MHz], ISO14443 Type A is a modulation format in which the modulation degree is 100[%] and the electromagnetic field is turned off when modulation is performed. On the other hand, as shown in FIG. 4B, ISO14443 Type B and Felica (registered trademark) are modulation formats in which the modulation degree is 10 [%], and the change of amplitude is small. There are many RFID tags which do not comply with these standards.

In the description of the present embodiment, the RF output circuit 18A sets the modulation degree of the ASK modulation switching between two types of modulation degrees which are 30[%] and 10[%], however the embodiment is not limited to the above.

Next, the information stored in the portable terminal 10 is described with reference to FIG. 5. FIG. 5 shows a configuration of a modulation degree table 40.

The modulation degree table 40 stored in the flash memory 17 of the portable terminal 10 is a table including information to switch the modulation degree of the ASK modulation performed by the RF output circuit 18A of the RFID reader/writer section 18. As shown in FIG. 5, the modulation degree table 40 includes fields of a Rmod 41, a setting value 42, and a modulation degree 43.

The Rmod 41 is a type of resistance value of the amplitude adjustment resistance 183 of the RF output circuit 18A. In the present embodiment, two types which are R1 and R2 are set as the Rmod 41. The setting value 42 is a setting resistance value [Ω] of the amplitude adjustment resistance 183 corresponding to the Rmod 41. The modulation degree 43 is a modulation degree [%] of the ASK modulation performed by the RF output circuit 18A corresponding to the Rmod 41.

Next, the operation of the portable terminal 10 is described with reference to FIG. 6.

Figure 6:
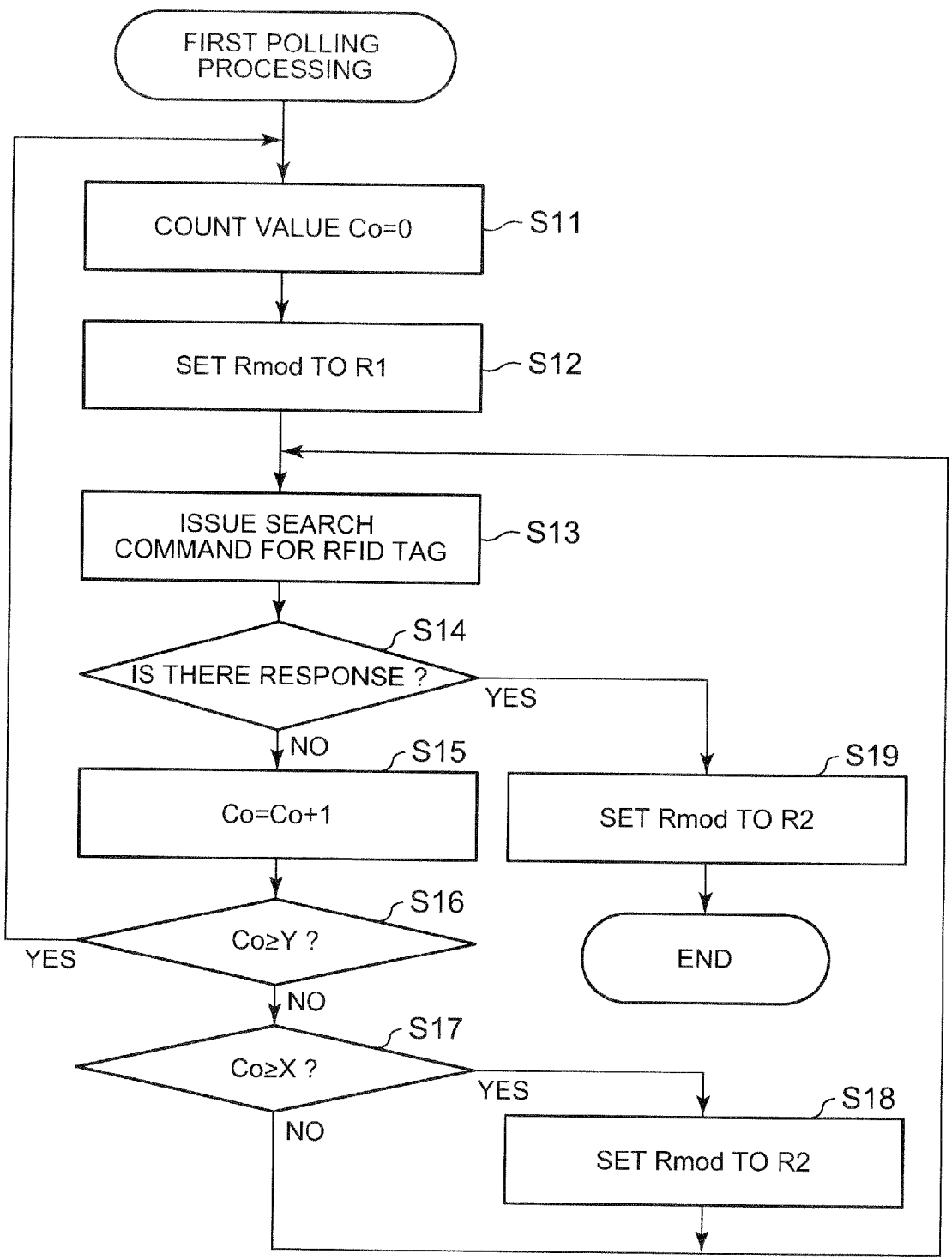
FIG. 6 is a flowchart showing a first polling processing.

FIG. 6 is a flowchart showing the first polling processing.

The first polling processing performed in the portable terminal 10 is processing to change the modulation degree of the ASK modulation of the RFID reader/writer section 18 to perform polling of the RFID tag 30 in user authentication. The user passes the badge including the RFID tag 30 which the user owns on the RFID reader/writer section 18.

In the portable terminal 10, for example, when the user operates the trigger button for reading the RFID tag in the operation section 12, the CPU 11 performs the first polling processing in coordination with the first polling program 151 read out from the ROM 15 and suitably expanded in the RAM 13.

The first polling processing is interrupted when, for example, the trigger button of the operation section 12 is operated during operation and the operation of the trigger button is stopped.

First, the CPU 11 sets the count value Co as a variable of the number of times of polling to 0 (step S11). Then, the CPU 11 refers to the modulation degree table 40 stored in the flash memory 17 and sets the Rmod which is a type of resistance value of the amplitude adjustment resistance 183 to the resistance value R1 (setting value 42:50 [Ω], modulation degree 43:30[%]) in the modulation section 184 (step S12).

Then, the CPU 11 issues a search command for the RFID tag 30 and information for search is transmitted (output from the electromagnetic field) from the RFID reader/writer section 18 as a response request (step S13).

Then, the CPU 11 uses the RFID reader/writer section 18 to judge whether or not there is a response to the response request from the RFID tag 30 (whether or not response information is received) (step S14). When there is no response from the RFID tag 30 (step S14; NO), the CPU 11 increments 1 to the count value Co (step S15). Then, the CPU 11 judges whether or not the count value Co is a preset threshold value Y or more (step S16). The threshold value Y is a threshold value of the count value Co which indicates the timing of reducing the modulation degree of the ASK modulation and reissuing the search command for the RFID tag 30.

When Co Y (step S16; YES), the processing advances to step S11. When Co<Y (step S16; NO), the CPU 11 judges whether or not the count value Co is a preset threshold value X or larger (step S17). The threshold value X is a threshold value of the count value Co indicating the timing of increasing the modulation degree of the ASK modulation and reissuing the search command for the RFID tag 30. Moreover, X<Y.

When Co≥X (step S16; YES), the CPU 11 refers to the modulation degree table 40 stored in the flash memory 17 and sets the Rmod which is a type of resistance value of the amplitude adjustment resistance 183 to the resistance value R2 (setting value 42:10 [Ω], modulation degree 43:10 [%]) in the modulation section 184 (step S18), and the processing advances to step S13. When Co<X (step S16; NO), the processing advances to step S13.

When there is a response from the RFID tag 30 (step S14; YES), the CPU 11 refers to the modulation degree table 40 stored in the flash memory 17 and sets the Rmod which is a type of resistance value of the amplitude adjustment resistance 183 to the resistance value R2 (setting value 42:10 [Ω], modulation degree 43:10[%]) in the modulation section 184 (step S19), and the first polling processing ends.

After the first polling processing, the RFID tag 30 reads out the user ID stored in the EEPROM and transmits the user ID to the portable terminal 10. The portable terminal 10 uses the user ID received from the RFID tag 30 to perform user authentication.

According to the above embodiment, when the portable terminal 10 performs polling of the RFID tag 30 with the RFID reader/writer section 18, the portable terminal 10 sets the modulation degree of the ASK modulation of the RFID reader/writer section 18 to a large degree, and when the response information is received from the RFID tag 30 through the RFID reader/writer section 18, the modulation degree of the ASK modulation of the RFID reader/writer section 18 is set to a small degree.

Therefore, compared to the normal polling processing, the electric power consumed in reading the RFID tag 30 can be reduced without reducing (changing) the reading speed of the RFID tag because there is no interval between polling. Moreover, compared to the normal polling processing, the electric power consumed in reading the RFID tag 30 can be reduced without reducing (changing) the communication range with the RFID tag 30 because the modulation degree of the ASK modulation is changed.

The portable terminal 10 changes the modulation degree of the ASK modulation of the RFID reader/writer section 18 by changing the resistance value of the amplitude adjustment resistance 183 of the RF output circuit 18A which outputs an electric signal to the antenna and matching circuit 185.

Therefore, the modulation degree of the ASK modulation of the RFID reader/writer section 18 can be easily changed.

When the portable terminal 10 performs polling of the RFID tag 30 with the RFID reader/writer section 18, the portable terminal 10 sets the modulation degree of the ASK modulation of the RFID reader/writer section 18 to a large degree, and at the timing when the count value Co during the polling becomes X or more, the portable terminal 10 sets the modulation degree of the ASK modulation of the RFID reader/writer section 18 to a small degree.

Therefore, the electric power consumed in reading the RFID tag 30 can be reduced and the reading of the RFID tag 30 can be securely performed.

Specifically, reduction of consumed electric power is effective because the portable terminal 10 is driven by the power source section 19 of the cell.

(First Modification)

The first modification of the present embodiment is described with reference to FIG. 7.

Figure 7:
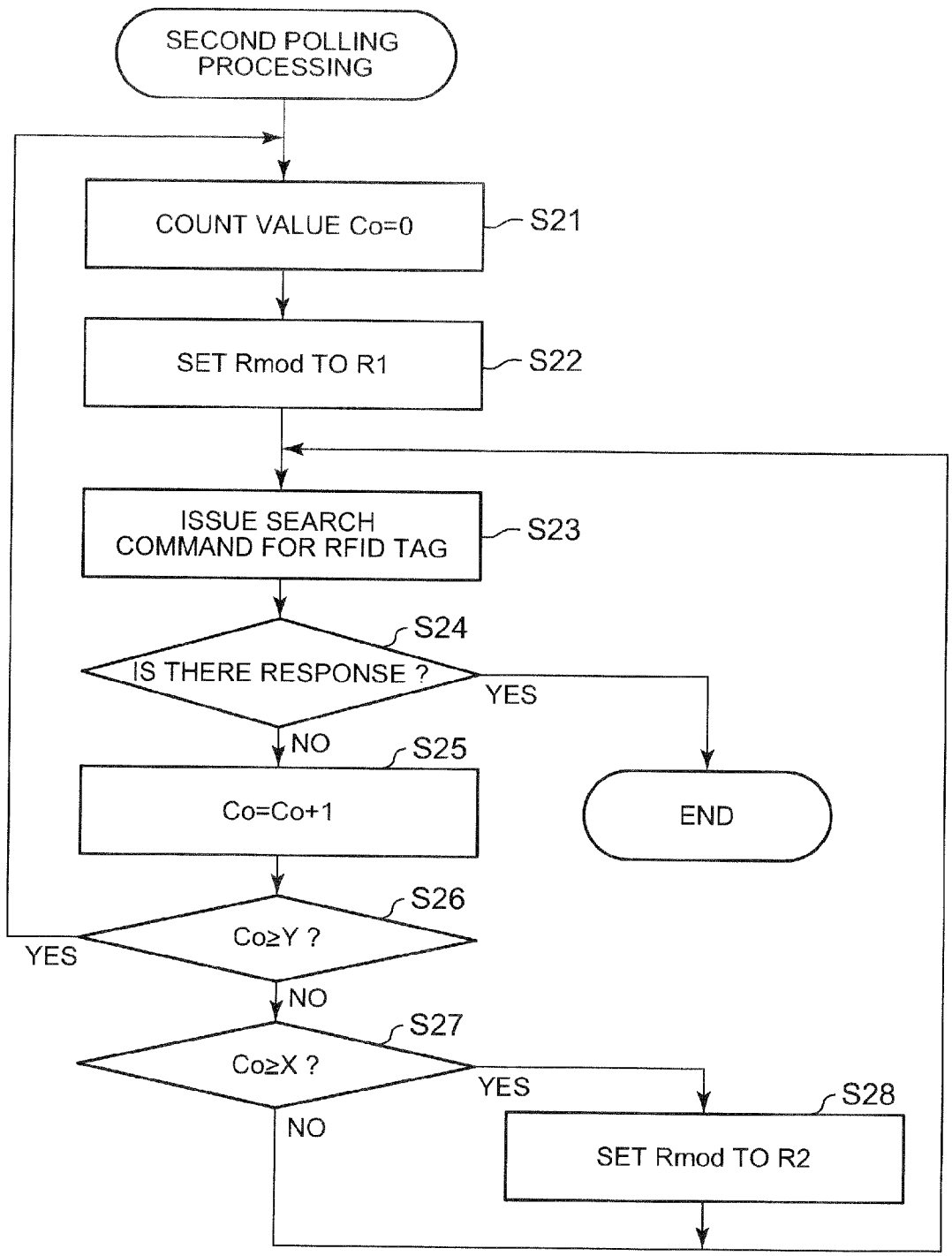
FIG. 7 is a flowchart showing a second polling processing.

FIG. 7 is a flowchart showing the second polling processing.

In the present modification, the portable terminal 10 of the above embodiment is used. However, instead of the first polling program 151, a second polling program is stored in the ROM 15.

The operation of the portable terminal 10 of the present modification is described with reference to FIG. 7.

In the portable terminal 10, for example, input of the user pressing the trigger button for reading the RFID tag in the operation section 12 acts as a trigger, and the CPU 11 performs the second polling processing in coordination with the second polling program read out from the ROM 15 and suitably expanded in the RAM 13.

Similar to the first polling processing, the second polling processing is processing to change the modulation degree of the ASK modulation of the RFID reader/writer section 18 to perform polling of the RFID tag 30 in user authentication.

As shown in FIG. 7, steps S21 to S28 are similar to step S11 to S18 of the first polling processing shown in FIG. 6.

When there is a response from the RFID tag 30 (step S24; YES), the second polling processing ends.

In other words, even if the response information is received from the RFID tag 30, the modulation degree of the ASK modulation of the RFID reader/writer section 18 is not changed and left as is.

Specifically, when the modulation degree is set to a large degree (30%) and the response information is received from the RFID tag 30, the portable terminal 10 judges communication can be performed even in the state where the modulation degree is large, and the modulation degree is set as is.

According to the present modification, when the modulation degree of the ASK modulation of the RFID reader/writer section 18 is set to a large degree and the response information is received from the RFID tag 30 through the RFID reader/writer section 18, the portable terminal 10 does not change the modulation degree of the ASK modulation of the RFID reader/writer section 18.

Therefore, compared to the above embodiment, the electric power consumed in reading the RFID tag 30 can be reduced even more.

(Second Modification)

The above embodiment includes a configuration in which according to the time passing (count up of the count value Co) in polling, the Rmod which is a type of resistance value of the amplitude adjustment resistance 183 of the RF output circuit 18A is changed between two steps such as R1→R2→R1 and so on.

However, the second modification of the embodiment can include a configuration which finely changes the Rmod which is a type of resistance value of the RF output circuit 18A among three steps or more as the count value Co becomes larger.

For example, according to the time passing (count up of the count value Co), the second modification can be a configuration in which the Rmod which is a type of resistance value of the amplitude adjustment resistance 183 is changed among four steps such as R1→R2→R3→R4→R1→ and so on (R1>R2>R3>R4).

According to the modification, the portable terminal 10 sets the modulation degree of the ASK modulation of the RFID reader/writer section 18 to a large degree when polling of the RFID tag is performed by the RFID reader/writer section 18 and the portable terminal 10 sets the modulation degree of the ASK modulation of the RFID reader/writer section 18 smaller step by step at plurality of timings during the polling.

Therefore, the response information from the RFID tag 30 can be received at an even more suitable degree of the modulation degree, and the electric power consumed in reading the RFID tag 30 can be reduced even more.

(Third Modification)

The third modification of the embodiment is described with reference to FIG. 8, FIG. 9A and FIG. 9B.

Figure 8:
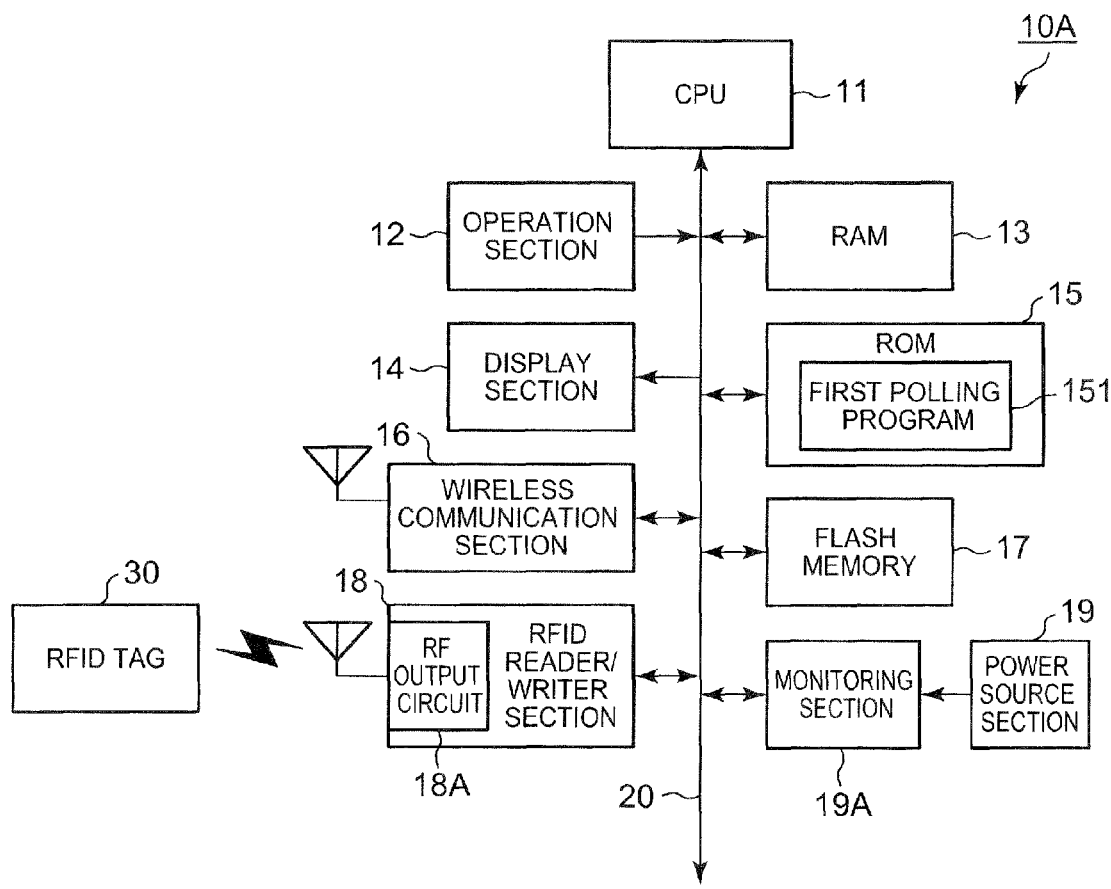
FIG. 8 is a block diagram showing a configuration of a portable terminal of a third modification.

FIG. 8 is a block diagram showing a configuration of a portable terminal 10A of the third modification.

Figure 9A:
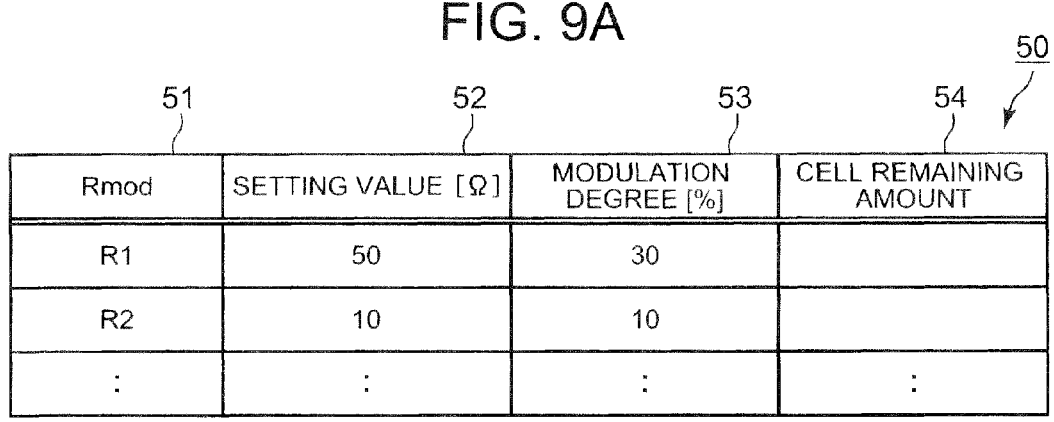
FIG. 9A is a diagram showing a configuration of a second modulation degree table.

FIG. 9A is a diagram showing a configuration of the modulation degree table 50.

Figure 9B:
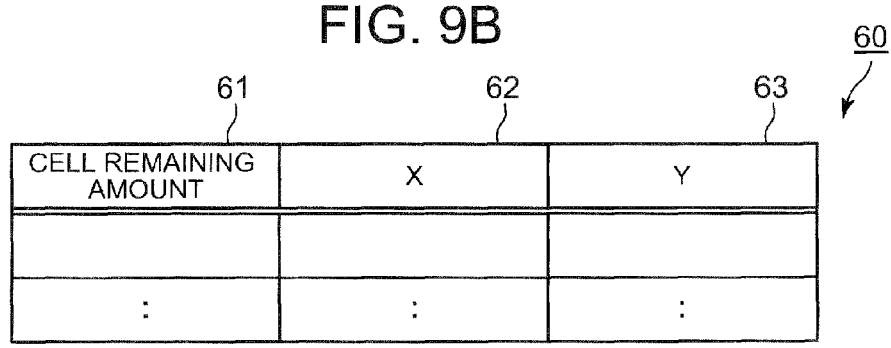
FIG. 9B is a diagram showing a configuration of a threshold value table.

FIG. 9B is a diagram showing a configuration of the threshold value table 60.

In the modification, a portable terminal 10A shown in FIG. 8A is used instead of the portable terminal 10 of the above embodiment. The same reference numerals are applied to the portions of the portable terminal 10A which are the same as the portable terminal 10 and the description is omitted.

The portable terminal 10A includes a CPU 11, an operation section 12, a RAM 13, a display section 14, a ROM 15, a wireless communication section 16, a flash memory 17, an RFID reader/writer section 18, a power source section 19 and a monitoring section 19A. Each section of the portable terminal 10A other than the power source section 19 are connected to each other through a bus 20.

The monitoring section 19A measures and monitors the remaining amount of the cell of the power source section 19 and outputs the information of the remaining amount of the cell to the CPU 11.

Next, the information stored in the flash memory 17 is described with reference to FIG. 9A and FIG. 9B.

The flash memory 17 stores the modulation degree table 50 shown in FIG. 9A and the threshold value table 60 shown in FIG. 9B.

The modulation degree table 50 includes fields of a Rmod 51 which is a type of resistance value of the amplitude adjustment resistance 183, a setting value 52, a modulation degree 53, and a cell remaining amount 54.

The Rmod 51, the setting value 52, and the modulation degree 53 are similar to the Rmod 41, the setting value 42, and the modulation degree 43 of the modulation degree table 40 of the above embodiment.

The cell remaining amount 54 is information of the remaining amount (range) of the cell of the power source section 19 corresponding to the Rmod 51.

However, the Rmod 51, the setting value 52 and the modulation degree 53 include information corresponding to a plurality of different resistance values R1 and R2 depending on the different value (range) of the cell remaining amount 54. For example, the smaller the cell remaining amount 54 is, the setting value 52 is set even smaller (the modulation degree 53 is set even larger).

The threshold value table 60 includes fields of cell remaining amount 61, X62 as a threshold value and Y63 as a threshold value. The cell remaining amount 61 is information of the remaining amount (range) of the cell of the power source section 19. X62 is the value of the threshold value X of the count value Co corresponding to the cell remaining amount 61. Y63 is the value of the threshold value Y of the count value Co corresponding to the cell remaining amount 61. For example, the smaller the cell remaining amount 61 is, the smaller the value X62 is set.

Next, the operation of the portable terminal 10A of the present modification is described. Similar to the above embodiment, the first polling processing is performed in the portable terminal 10. However, while the first polling processing is performed, the monitoring section 19A repeatedly obtains information of the remaining amount of the cell of the power source section 19 and outputs the information to the CPU 11.

In the present modification, in step S12 of the first polling processing shown in FIG. 6, the CPU 11 refers to the modulation degree table 50 stored in the flash memory 17, obtains the information of the remaining amount of the cell from the monitoring section 19A and sets the Rmod which is a type of resistance value of the amplitude adjustment resistance 183 to the setting value 52 of the resistance value R1 corresponding to the obtained cell remaining amount 54 in the modulation section 184.

In step S16, the CPU 11 refers to the threshold value table 60 stored in the flash memory 17, obtains the information of the remaining amount of the cell from the monitoring section 19A, and judges whether or not the count value Co is a threshold value Y63 corresponding to the obtained cell remaining amount 61 or more. In step S17, the CPU 11 refers to the threshold value table 60 stored in the flash memory 17, obtains the information of the remaining amount of the cell from the monitoring section 19A and judges whether or not the count value Co is a threshold value X62 or more corresponding to the obtained cell remaining amount 61.

In steps S18 and S19, the CPU 11 refers to the modulation degree table 50 stored in the flash memory 17, obtains the information of the remaining amount of the cell from the monitoring section 19A and sets the Rmod which is a type of the resistance value of the amplitude adjustment resistance 183 to the setting value 52 of the resistance value R2 corresponding to the obtained cell remaining amount 54 in the modulation section 184.

According to the present modification, the portable terminal 10A changes the modulation degree of the ASK modulation of the RFID reader/writer section 18 and the timing of setting the modulation degree of the ASK modulation of the RFID reader/writer section 18 smaller during polling according to the remaining amount of the cell of the power source section 19 obtained from the monitoring section 19A.

Therefore, the smaller the remaining amount of the cell is, the larger the modulation degree of the ASK modulation can be set, and the timing of setting the modulation degree of the ASK modulation smaller can be made early. Consequently, the electric power consumed in reading the RFID tag 30 can be reduced even more.

Alternatively, the modification can include a configuration in which the CPU 11 of the portable terminal 10A changes either one of the modulation degree of the ASK modulation of the RFID reader/writer section 18 or the timing of setting the modulation degree of the ASK modulation of the RFID reader/writer section 18 smaller during polling according to the remaining amount of the cell of the power source section 19 obtained from the monitoring section 19A.

(Fourth Modification)

The fourth modification of the embodiment is described with reference to FIG. 10.

Figure 10:
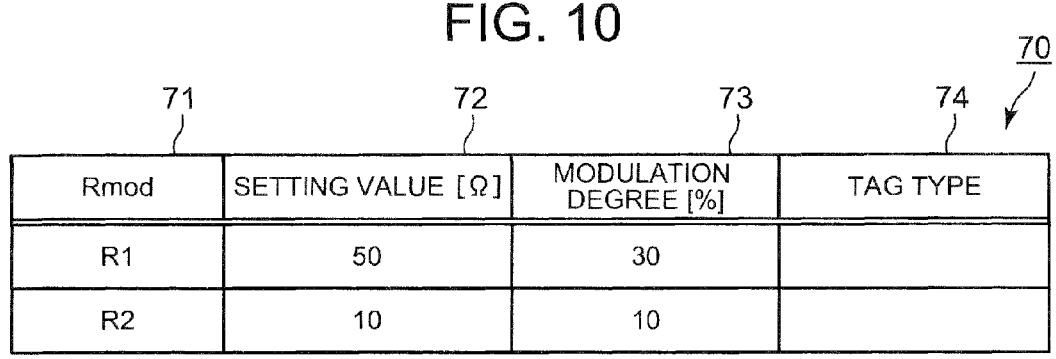
FIG. 10 is a diagram showing a configuration of a third modulation degree table.

FIG. 10 is a diagram showing a configuration of the modulation degree table 70.

The present modification uses a portable terminal 10 of the above embodiment. Instead of the modulation degree table 40 shown in FIG. 5, the flash memory 17 stores the modulation degree table 70 shown in FIG. 10.

As shown in FIG. 10, the modulation degree table 70 includes fields of a Rmod 71 which is a type of resistance value of the amplitude adjustment resistance 183, a setting value 72, a modulation degree 73 and a tag type 74.

The Rmod 71, the setting value 72, and the modulation degree 73 are similar to the Rmod 41, the setting value 42 and the modulation degree 43 of the modulation degree table 40 of the present embodiment. The tag type 74 is information indicating a type of RFID tag 30.

The tag type 74 is, for example, identification information of the manufacturer of the RFID tag 30.

Each of the Rmod 71, the setting value 72 and the modulation degree 73 (resistance value R1 or R2) include information of a value suitable for communication using the RFID reader/writer section 18 corresponding to the tag type 74.

Next, the operation of the portable terminal 10 of the present modification is described. Similar to the above embodiment, the first polling processing is performed in the portable terminal 10.

When polling is performed from the portable terminal 10, the response information obtained from the RFID tag 30 includes the individual identification information of the RFID tag 30. The individual identification information includes tag type (for example, identification information of the manufacturer) of the RFID tag 30. Depending on the tag type, the modulation degree may not comply with the standard. For example, the modulation degree of an RFID tag manufactured by a certain maker may not comply with the standard. When a response is returned from such RFID tag, it is not necessarily best to set the modulation degree according to the standard in order to realize stable communication. Therefore, a suitable setting value 72 is set according to the model number of the IC (Integrated Circuit) or the antenna shape specified by the tag type 74 included in the response information from the RFID tag 30.

In the present modification, in step S19 of the first polling processing shown in FIG. 6, the CPU 11 refers to the modulation degree table 70 stored in the flash memory 17 and sets the Rmod which is a type of the resistance value of the amplitude adjustment resistance 183 to the setting value 72 of the resistance value corresponding to the tag type 74 included in the response information received in step S14 in the modulation section 184.

According to the present modification, when the portable terminal 10 receives response information from the RFID tag 30 through the RFID reader/writer section 18, the modulation degree of the ASK modulation of the RFID reader/writer section 18 is set according to the information of the type of the RFID tag specified by the identification information of the RFID tag 30 included in the response information.

Therefore, when there is a response from the RFID tag, communication can be performed with the RFID tag at a modulation degree of the ASK modulation suitable for communication according to the type of the RFID tag.

The above description discloses an example using the ROM 15 as the computer readable medium of the computer program product of the present invention, however, the example is not limited to the above.

As other computer readable mediums, a nonvolatile memory such as a flash memory, etc., a portable recording medium such as a CD-ROM, etc. can be applied.

Moreover, as a medium which provides data of the computer program product of the present invention through communication lines, a carrier wave can be applied to the present invention.

The description of the embodiment and each modification is one example of the communication apparatus and the computer program product of the present invention, and the present invention is not limited to the above. For example, at least two of the above embodiment and modifications can be combined.

According to the above embodiment and modifications, portable terminals 10 and 10A as the communication apparatus are configurations of the handy terminal including the RFID reader/writer section 18, however, the configuration is not limited to the above. A communication apparatus is suitable as long as the communication apparatus at least includes a function of reading information of an RFID tag.

The communication apparatus can be a configuration using other portable terminals such as a PDA, cellular telephone, laptop personal computer, etc.

The communication apparatus can be a fixed communication apparatus.

In the above embodiments and modifications, the RFID tag 30 includes RFID cards (noncontact IC card). For example, the RFID tag includes RFID cards owned by users such as employee ID card, travel card, electronic money card.

In the embodiment and modifications, the description describes a configuration in which the modulation degree of the ASK modulation is changed in polling processing of the portable terminals 10 and 10A when user authentication is performed using the RFID tag 30, however, the configuration is not limited to the above. For example, a configuration is possible in which the modulation degree of the ASK modulation is changed in other polling processing such as when an RFID tag 30 attached to equipment of a warehouse, merchandise of a store, etc. is read or when an electronic money card presented for payment from a client is read.

In the above embodiment and modifications, the description describes a configuration in which the RFID tag 30 and the RFID reader/writer section 18 is an RFID tag and an RFID reader/writer section of an electromagnetic induction type, however, the configuration is not limited to the above. The RFID tag 30 and the RFID reader/writer section 18 can be an RFID tag and an RFID reader/writer section of a radio wave type.

In the above embodiment and modifications, the description describes a configuration which performs polling when the trigger key of the operation section 12 is pressed in each polling processing, however the configuration is not limited to this. A configuration is possible in which the polling is performed automatically without operation through the operation section 12 by performing the above polling processing program.

Needless to say, the detailed configuration and the detailed operation of each component of the portable terminals 10 and 10A of the above embodiment and modifications can be suitably changed within the scope of the present invention.

Although the embodiment and the modifications of the present invention are described above, the scope of the present invention is not limited to the above described embodiment and modifications and includes the scope of claims described in the attached claims and its equivalents.

The entire disclosure of Japanese Patent Application No. 2011-041073 filed on Feb. 28, 2011 including specification, claims, drawings and abstract are incorporated herein by reference in its entirety.

What is claimed is:

1. A communication apparatus which is configured to read an RFID tag, the communication apparatus comprising:
    a communication section which performs communication in an ASK modulation format with an RFID tag; and
    a control section which (i) when a user operates an operation section provided in a main body of the apparatus to cause the communication section to perform polling to search for the RFID tag, controls the communication section to search for the RFID tag in a state in which a modulation degree of the ASK modulation of the communication section is set to a first modulation degree larger than a second modulation degree set in advance and an electric current flowing to the communication section is made to be a first electric current amount smaller than a second electric current amount set in advance, and (ii) when the RFID tag is found by receiving response information from the RFID tag through the communication section, controls the communication section to communicate with the RFID tag in a state in which the modulation degree is set to the second modulation degree smaller than the first modulation degree and the electric current flowing to the communication section is made to be the second electric current amount larger than the first electric current amount,
    wherein the control section (i) controls the communication section to search for the RFID tag in a state in which the modulation degree is set to the first modulation degree and the electric current flowing to the communication section is made to be the first electric current amount when polling to search for the RFID tag is performed by the communication section, and (ii) controls the communication section to search for the RFID tag in a state in which the modulation degree is set to the second modulation degree and the electric current flowing to the communication section is made to be the second electric current, when the RFID tag cannot be found after the polling is performed a predetermined number of times.

2. The communication apparatus according to claim 1, wherein:
    the communication section includes an antenna and an amplitude adjustment resistance which can change amplitude of an electric signal output from the antenna; and
    the control section changes the modulation degree by changing a resistance value of the amplitude adjustment resistance.

3. The communication apparatus according to claim 1, wherein the control section (i) controls the communication section to search for the RFID tag in a state in which the modulation degree is set to the first modulation degree and the electric current flowing to the communication section is made to be the first electric current amount when the polling to search for the RFID tag is performed by the communication section, and (ii) controls the communication section to search for the RFID tag in a state in which the modulation degree is set, step by step, to be smaller than the first modulation degree and the electric current flowing to the communication section is made, step by step, to be larger than the first electric current amount, when the RFID tag cannot be found after the polling is performed a predetermined number of times.

4. The communication apparatus according to claim 1, further comprising:
    a power source section which includes a cell; and
    a monitoring section which obtains a cell remaining amount of the power source section,
    wherein the modulation degree or a timing to set the modulation degree smaller during the polling is changed according to the cell remaining amount obtained from the monitoring section.

5. The communication apparatus according to claim 1, wherein the control section sets the modulation degree according to a type of RFID tag specified by the identification information of the RFID tag included in the response information when the response information is received from the RFID tag through the communication section.

6. The communication apparatus according to claim 1, wherein the control section controls the communication section to search for the RFID tag when the user operates a certain button of the operation section.

7. The communication apparatus according to claim 1, wherein the communication apparatus includes a battery as a power source and is a portable terminal which can be carried by a user.

8. The communication apparatus according to claim 1, further comprising:
a modulation degree storage section which stores a value of the first modulation degree and a value of the second modulation degree,
wherein the control section controls the communication section to search for the RFID tag by setting the modulation degree of the ASK modulation to the first modulation degree based on the value of the first modulation degree stored in the modulation degree storage section, and controls the communication section to communicate with the RFID tag by setting the modulation degree of the ASK modulation to the second modulation degree based on the value of the second modulation degree stored in the modulation degree storage section.

9. The communication apparatus according to claim 1, wherein:
the communication section includes a RF output circuit including an antenna and an amplitude adjustment resistance which can change an amplitude of an electric signal output from the antenna; and
the control section changes the modulation degree of the ASK modulation of the communication section by changing a resistance value of the amplitude adjustment resistance in the RF output circuit.

10. A non-transitory computer readable storage medium having stored thereon a computer program that is executable by a computer used in a communication apparatus which is configured to read an RFID tag, the program being executable by the computer to control the computer to function as:
a communication section which performs communication in an ASK modulation format with an RFID tag; and
a control section which (i) when a user operates an operation section provided in a main body of the apparatus to cause the communication section to perform polling to search for the RFID tag, controls the communication section to search for the RFID tag in a state in which a modulation degree of the ASK modulation of the communication section is set to a first modulation degree larger than a second modulation degree set in advance and an electric current flowing to the communication section is made to a first electric current amount smaller than a second electric current amount set in advance, and which (ii) when the RFID tag is found by receiving response information from the RFID tag through the communication section, controls the communication section to communicate with the RFID tag in a state in which the modulation degree is set to the second modulation degree smaller than the first modulation degree and an electric current flowing to the communication section is made to the second electric current amount larger than the first electric current amount,
wherein the control section (i) controls the communication section to search for the RFID tag in a state in which the modulation degree is set to the first modulation degree and the electric current flowing to the communication section is made to be the first electric current amount when polling to search for the RFID tag is performed by the communication section, and (ii) controls the communication section to search for the RFID tag in a state in which the modulation degree is set to the second modulation degree and the electric current flowing to the communication section is made to be the second electric current, when the RFID tag cannot be found after the polling is performed a predetermined number of times.

11. A communication apparatus which is configured to read an RFID tag, the communication apparatus comprising:
a communication section which performs communication in an ASK modulation format with an RFID tag;
a control section which (i) when a user operates an operation section provided in a main body of the apparatus to cause the communication section to perform polling to search for the RFID tag, controls the communication section to search for the RFID tag in a state in which a modulation degree of the ASK modulation of the communication section is set to a first modulation degree larger than a second modulation degree set in advance and an electric current flowing to the communication section is made to be a first electric current amount smaller than a second electric current amount set in advance, and (ii) when the RFID tag is found by receiving response information from the RFID tag through the communication section, controls the communication section to communicate with the RFID tag in a state in which the modulation degree is set to the second modulation degree smaller than the first modulation degree and the electric current flowing to the communication section is made to be the second electric current amount larger than the first electric current amount;
a power source section which includes a cell; and
a monitoring section which obtains a cell remaining amount of the power source section,
wherein the modulation degree or a timing to set the modulation degree smaller during the polling is changed according to the cell remaining amount obtained from the monitoring section.

12. A non-transitory computer readable storage medium having stored thereon a computer program that is executable by a computer used in a communication apparatus which is configured to read an RFID tag and which includes a power source section which includes a cell, and a monitoring section which obtains a cell remaining amount of the power source section, the program being executable by the computer to control the computer to function as:
a communication section which performs communication in an ASK modulation format with an RFID tag; and
a control section which (i) when a user operates an operation section provided in a main body of the apparatus to cause the communication section to perform polling to search for the RFID tag, controls the communication section to search for the RFID tag in a state in which a modulation degree of the ASK modulation of the communication section is set to a first modulation degree larger than a second modulation degree set in advance and an electric current flowing to the communication section is made to a first electric current amount smaller than a second electric current amount set in advance, and which (ii) when the RFID tag is found by receiving response information from the RFID tag through the communication section, controls the communication section to communicate with the RFID tag in a state in which the modulation degree is set to the second modulation degree smaller than the first modulation degree and an electric current flowing to the communication section is made to the second electric current amount larger than the first electric current amount;
wherein the modulation degree or a timing to set the modulation degree smaller during the polling is changed according to the cell remaining amount obtained from the monitoring section.

* * * * *